United States Patent
Usui et al.

(10) Patent No.: US 11,661,502 B2
(45) Date of Patent: May 30, 2023

(54) RESIN COMPOSITION, MELT-FORMING MATERIAL, MULTILAYER STRUCTURE, AND LIQUID PACKAGING MATERIAL

(71) Applicant: Mitsubishi Chemical Corporation, Tokyo (JP)

(72) Inventors: Shintaro Usui, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/869,930

(22) Filed: May 8, 2020

(65) Prior Publication Data

US 2020/0263010 A1 Aug. 20, 2020

Related U.S. Application Data

(63) Continuation of application No. PCT/JP2018/043118, filed on Nov. 22, 2018.

(30) Foreign Application Priority Data

Nov. 22, 2017 (JP) .............................. JP2017-224272

(51) Int. Cl.
| | |
|---|---|
| C08L 23/28 | (2006.01) |
| C08L 23/06 | (2006.01) |
| C08L 23/12 | (2006.01) |
| C08L 23/20 | (2006.01) |
| B32B 27/32 | (2006.01) |
| C08K 5/101 | (2006.01) |
| B32B 27/30 | (2006.01) |
| C08L 23/08 | (2006.01) |

(52) U.S. Cl.
CPC ........ *C08L 23/0846* (2013.01); *B32B 27/306* (2013.01); *B32B 27/32* (2013.01); *C08K 5/101* (2013.01); *C08L 23/06* (2013.01); *C08L 23/12* (2013.01); *C08L 23/20* (2013.01); *B32B 2439/00* (2013.01)

(58) Field of Classification Search
None
See application file for complete search history.

(56) References Cited

U.S. PATENT DOCUMENTS

| | | | |
|---|---|---|---|
| 5,744,547 | A | 4/1998 | Moritani et al. |
| 2006/0163099 | A1* | 7/2006 | McGovern ............... G03C 3/00 206/407 |
| 2012/0009431 | A1 | 1/2012 | Kazeto |
| 2012/0052225 | A1 | 3/2012 | Kani et al. |
| 2013/0040157 | A1 | 2/2013 | Igarashi et al. |
| 2014/0031487 | A1* | 1/2014 | Guy ....................... C08F 253/00 524/572 |
| 2015/0152256 | A1 | 6/2015 | Nakazawa et al. |
| 2016/0215116 | A1 | 7/2016 | Kani |
| 2016/0221313 | A1 | 8/2016 | Kawai et al. |
| 2016/0229987 | A1 | 8/2016 | Kawai et al. |
| 2017/0087812 | A1 | 3/2017 | Hirose |
| 2018/0319965 | A1 | 11/2018 | Seno et al. |
| 2019/0077945 | A1 | 3/2019 | Hashimoto et al. |

FOREIGN PATENT DOCUMENTS

| | | |
|---|---|---|
| CN | 102348749 A | 2/2012 |
| CN | 104350103 A | 2/2015 |
| CN | 105593291 A | 5/2016 |
| CN | 105612211 A | 5/2016 |
| EP | 2407508 A2 | 1/2012 |
| EP | 2554590 A * | 6/2013 |
| EP | 3053959 A1 | 8/2016 |
| EP | 3121230 A1 | 1/2017 |
| EP | 3467027 A1 | 4/2019 |
| JP | 09-071620 | 3/1997 |
| JP | 2007-314788 A * | 12/2007 |
| JP | 2011-202147 | 10/2011 |
| TW | 201728605 A | 8/2017 |
| WO | 2011/118762 | 9/2011 |
| WO | 2015/041258 | 3/2015 |
| WO | 2015/050211 | 4/2015 |
| WO | 2015/141610 | 9/2015 |
| WO | 2017/082063 | 5/2017 |
| WO | 2017/089563 | 6/2017 |
| WO | 2017/204272 | 11/2017 |

OTHER PUBLICATIONS

ISR issued in WIPO Patent Application No. PCT/JP2017/019451, Aug. 15, 2017, English translation.
IPRP issued in WIPO Patent Application No. PCT/JP2017/019451, Nov. 27, 2018, English translation.
ISR issued in WIPO Patent Application No. PCT/JP2018/043118, Feb. 19, 2019, English translation.
IPRP issued in WIPO Patent Application No. PCT/JP2018/043118, May 26, 2020, English translation.
SESR issued in EP Patent Application No. 18882054.2, Nov. 9, 2020.
Official Communication issued in EP Patent Application No. 18882054.2, dated Dec. 23, 2021.
Office Action issued in CN Patent Application No. 201880074075.0, dated Feb. 11, 2022, translation.
Office Action issued in JP Patent Application No. 2018-562131, dated Jun. 21, 2022, translation.

(Continued)

*Primary Examiner* — Tae H Yoon
(74) *Attorney, Agent, or Firm* — Greenblum & Bernstein, P.L.C.

(57) ABSTRACT

A resin composition contains: (A) an ethylene-vinyl alcohol copolymer; (B) an olefin polymer; and (C) a sorbic acid ester; wherein the sorbic acid ester (C) is present in an amount of 0.00001 to 10 ppm based on the weight of the resin composition. The resin composition exhibits reduced susceptibility to coloration.

8 Claims, No Drawings

(56) References Cited

OTHER PUBLICATIONS

Office Action issued in TW Patent Application No. 107141692, dated Jun. 27, 2022, translation.
Office Action issue in CN Patent Application No. 201880074075.0, dated Jul. 28, 2022, translation.

* cited by examiner

RESIN COMPOSITION, MELT-FORMING MATERIAL, MULTILAYER STRUCTURE, AND LIQUID PACKAGING MATERIAL

RELATED APPLICATION

This application is a continuation of International Application No. PCT/JP2018/043118, filed on Nov. 22, 2018, which claims priority to Japanese Patent Application No. 2017-224272, filed on Nov. 22, 2017, the entire contents of each of which being hereby incorporated by reference.

TECHNICAL FIELD

The present disclosure relates to a resin composition containing an ethylene-vinyl alcohol copolymer (hereinafter referred to as "EVOH"), a melt-forming material produced by using the resin composition, a multilayer structure, and a liquid packaging material. More specifically, the present disclosure relates to a resin composition less susceptible to coloration, a melt-forming material formed from the resin composition, a multilayer structure including a layer formed from the resin composition, and a liquid packaging material.

BACKGROUND ART

The EVOH is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials. The EVOH, though being excellent in gas barrier properties, disadvantageously tends to be brittle and less flexible because of its higher crystallinity with hydroxyl groups richly present in its molecular chains.

In applications requiring flexibility for liquid packaging materials and the like, the EVOH is generally blended with a soft resin in order to impart a product formed from the EVOH with flexibility.

PTL 1, for example, proposes a resin composition having flexibility sufficient for preventing pinholes and the like and excellent forming stability for bag-in-box type containers which are repeatedly bent for a prolonged period to be subjected to deformation. The resin composition contains: (A) a saponified ethylene-vinyl ester copolymer having an ethylene content of 20 to 60 mol %; (B) an olefin polymer; (C) a carboxyl-modified olefin polymer; and (D) a hydrocarbon resin having a number average molecular weight of 100 to 3,000 and a softening point of not lower than 60° C. and lower than 170° C.

Further, PTL 2 proposes that, in order to provide a resin composition having an excellent extrusion stability, a resin composition is used which contains: (A) an ethylene-vinyl alcohol copolymer; (B) an unmodified ethylene-α-olefin copolymer; (C) an acid-modified ethylene-α-olefin copolymer; and (D) an alkali metal salt; wherein the components (A) to (D) are present in a specific blend ratio.

RELATED ART DOCUMENT

Patent Document

PTL 1: JP-A-2011-202147
PTL 2: WO2015/141610

SUMMARY

The resin compositions each containing the EVOH and the olefin polymers as disclosed in PTL 1 and PTL 2 are highly flexible, but tend to be colored due to heating during melt kneading and melt forming. Therefore, improvement is required.

The inventors conducted intensive studies in view of the foregoing and, as a result, found that, where a resin composition containing the EVOH and an olefin polymer further contains a specific very small amount of a sorbic acid ester, the above problem can be solved.

According to a first aspect of the present disclosure, there is provided a resin composition containing: (A) an EVOH; (B) an olefin polymer; and (C) a sorbic acid ester; wherein the sorbic acid ester (C) is present in an amount of 0.00001 to 10 ppm based on the weight of the resin composition. According to a second aspect of the present disclosure, a melt-forming material formed from the resin composition is provided. According to a third aspect of the present disclosure, a multilayer structure including a layer formed from the resin composition is provided. According to a fourth aspect of the present disclosure, a liquid packaging material formed from the multilayer structure is provided.

The resin composition of the present disclosure contains the EVOH (A), the olefin polymer (B), and the sorbic acid ester (C). In the resin composition, the sorbic acid ester (C) is present in an amount of 0.00001 to 10 ppm based on the weight of the resin composition. Thus, the resin composition containing the EVOH (A) and the olefin polymer (B) is highly effective in suppressing the coloration due to the heating in the melt kneading and the melt forming.

Where the EVOH (A) and the olefin polymer (B) are present in a weight ratio (A)/(B) of 1/99 to 99/1 in the resin composition, the coloration suppressing effect is more excellent.

Where the olefin polymer (B) has a density of 0.85 to 0.96 g/cm$^3$, the coloration suppressing effect is still more excellent.

Where the olefin polymer (B) is at least one selected from the group consisting of polyolefin, olefin thermoplastic elastomer, aliphatic rubber, olefin-(meth)acrylate copolymer, and ionomer, the coloration suppressing effect is still more excellent.

Where the olefin polymer (B) has a flexural modulus of less than 150 MPa as measured at 23° C. at 50% RH, the coloration suppressing effect is still more excellent.

The melt-forming material formed from the resin composition of the present disclosure is less susceptible to the coloration and, therefore, is formed into various products, which can be advantageously used as packaging materials, for example, for foods, chemical agents, agricultural chemicals, and the like, particularly used as liquid packaging materials.

The multilayer structure including the layer formed from the resin composition of the present disclosure is less susceptible to the coloration and, therefore, is formed into various products, which can be advantageously used as packaging materials, for example, for foods, chemical agents, agricultural chemicals, and the like, particularly used as liquid packaging materials.

DESCRIPTION OF EMBODIMENTS

Preferred embodiments of the present disclosure will hereinafter be described in detail. It should be understood that these preferred embodiments are illustrative but not limitative.

In the present disclosure, the term "(meth)acryl" means acryl or methacryl.

<Resin Composition>

The resin composition of the present disclosure contains: (A) an EVOH; (B) an olefin polymer; and (C) a sorbic acid ester. The components of the resin composition of the present disclosure will hereinafter be described in turn.

[EVOH (A)]

The EVOH (A) to be used in the present disclosure is a water-insoluble thermoplastic resin which is typically prepared by copolymerizing ethylene and a vinyl ester monomer and then saponifying the resulting copolymer, and is generally referred to as ethylene-vinyl alcohol copolymer or saponified ethylene-vinyl ester copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and generally further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters are typically each used alone or, as required, a plurality of vinyl esters may be selected from these vinyl esters to be used in combination.

The ethylene structural unit content of the EVOH (A), which is measured in conformity with ISO14663, is typically 20 to 60 mol %, preferably 25 to 50 mol %, particularly preferably 25 to 45 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The vinyl ester saponification degree of the EVOH (A), which is measured in conformity with JIS K6726 (with the use of a solution obtained by homogenously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may further contain a structural unit derived from any of the following exemplary comonomers in an amount that does not impair the effects of the present disclosure (e.g., typically in an amount of not greater than 20 mol %, preferably not greater than 10 mol %, of the EVOH (A)).

The comonomers include: hydroxyl-containing α-olefins such as 2-propen-1-ol, 3-buten-1-ol, 4-penten-1-ol, 5-hexen-1-ol, 3,4-dihydroxy-1-butene, and 4-hexene-1,2-diol, and derivatives including esterification products (acylation products) of these hydroxyl-containing α-olefins such as 3,4-diacyloxy-1-butene, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxymethyl vinylidenes such as 1,3-hydroxy-2-methylenepropane and 1,5-hydroxy-3-methylenepentane, and esterification products of these hydroxymethyl vinylidenes (i.e., vinylidene diacetates) such as 1,3-diacetoxy-2-methylenepropane, 1,3-dipropionyloxy-2-methylenepropane, and 1,3-dibutyronyloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1 to C18 alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH containing a structural unit having a primary hydroxyl group in its side chain among structural units derived from the aforementioned comonomers is preferred because the secondary formability is improved in stretching process, vacuum pressure forming process, and the like. Particularly, an EVOH containing a structural unit having 1,2-diol in its side chain is preferred.

Where the EVOH (A) contains the structural unit having the primary hydroxyl group in its side chain, the primary hydroxyl group content is typically 0.1 to 20 mol %, preferably 0.1 to 15 mol %, particularly preferably 0.1 to 10 mol %.

The EVOH (A) may be a mixture of different EVOHs. These EVOHs may have different contents of the ethylene structural unit, different contents of the structural unit having the primary hydroxyl group in the side chain, different saponification degrees, and different melt flow rates (MFRs), and contain different comonomer components.

In the present disclosure, post-modified EVOHs such as urethanized EVOH, acetalized EVOH, cyanoethylated EVOH, and oxyalkylenated EVOH are also usable as the EVOH (A).

In the resin composition of the present disclosure, the EVOH (A) is typically present in an amount of not less than 1 wt. %, preferably not less than 50 wt. %, more preferably not less than 60 wt. %, still more preferably not less than 70 wt. %. The upper limit of the amount of the EVOH (A) is typically 99 wt. %. Where the amount of the EVOH (A) falls within the aforementioned ranges, the effects of the present disclosure tend to be efficiently provided.

[Olefin Polymer (B)]

The olefin polymer (B) to be used in the present disclosure is a lipophilic polymer containing an olefin monomer unit (aliphatic hydrocarbon monomer unit having a carbon-carbon double bond) as a main monomer unit, and typically having a number average molecular weight of not less than 10,000 with its main chain constituted only by carbon bonds. Specific examples of the olefin polymer (B) include polyolefin, olefin thermoplastic elastomer, aliphatic rubber, olefin-(meth)acrylate copolymer, and ionomer, which may be used alone or in combination. Of these, the polyolefin is preferred.

The olefin polymer (B) to be used in the present disclosure will hereinafter be described in detail.

Examples of the polyolefin include homopolymers of olefin monomers such as ethylene, propylene, and butene, and random copolymers and block copolymers of two or more such olefin monomers. Examples of the olefin homopolymers include polyethylenes such as very-low-density polyethylenes, (linear) low-density polyethylenes, and high-density polyethylenes, polypropylenes, polybutenes, and polymethylpentenes. Examples of the olefin block copolymers include: ethylene-α-olefin copolymers such as ethylene-propylene copolymers, ethylene-butene copolymers, ethylene-hexene copolymers, and ethylene-octene copolymers; propylene-α-olefin copolymers such as propylene-ethylene copolymers, and propylene-butene copolymers; and butene-α-olefin copolymers such as butene-ethylene copolymers, and butene-propylene copolymers. The olefin random copolymers are copolymers obtained by randomly copolymerizing two or more of the aforementioned olefin monomers, and having a lower crystallinity. Specific examples of the olefin random copolymers include TAFMER series (trade name) such as ethylene-based TAFMER, propylene-based TAFMER, and butene-based TAFMER available from Mitsui Chemicals, Inc.

The olefin thermoplastic elastomer is a thermoplastic elastomer resin containing a hard segment of a polyolefin (polyethylene, polypropylene or the like), and a soft segment of the aliphatic rubber (EPDM, EPM or the like). The olefin thermoplastic elastomer may be an olefin thermoplastic elastomer (compound type) synthesized by compounding the polyolefin and the aliphatic rubber, or an olefin thermoplastic elastomer (reactor type) synthesized by incorporating the aliphatic rubber into the polyolefin in the polymerization of the olefin. The compound type olefin thermoplastic elastomer is classified into a simple blend type (non-crosslink type) and a dynamic crosslink type (full crosslink type or partial crosslink type).

The aliphatic rubber is an elastomeric polymer such as a copolymer of an olefin monomer and a diene monomer, or a hydrogenation product of the copolymer. Specific examples of the aliphatic rubber include synthetic rubbers such as ethylene-propylene rubber (EPM), ethylene-propylene-diene rubber (EPDM), isoprene rubber (IR), butadiene rubber (BR), and butyl rubber (IIR).

Examples of the olefin-(meth)acrylate copolymer include ethylene-methyl acrylate copolymer, ethylene-ethyl acrylate copolymer, and ethylene-methyl methacrylate copolymer.

The ionomer is a metal salt of an ethylene-unsaturated carboxylic acid copolymer with its carboxyl group neutralized with a metal.

The olefin polymer (B) to be used in the present disclosure typically has a density of 0.85 to 0.96 g/cm$^3$, preferably 0.85 to 0.92 g/cm$^3$, more preferably 0.85 to 0.90 g/cm$^3$. Particularly, examples of an olefin polymer (B) having a density of 0.85 to 0.92 g/cm$^3$ include: low-crystallinity polyolefins such as polypropylenes, very-low-density polyethylenes, and ethylene-α-olefin random copolymers; aliphatic rubbers such as EPM and EPDM; and olefin thermoplastic elastomers.

Further, the olefin polymer (B) to be used in the present disclosure typically has a flexural modulus of less than 150 MPa, preferably less than 100 MPa, particularly preferably less than 50 MPa, as measured at 23° C. at 50% RH for higher flexural flexibility. Examples of an olefin polymer having a flexural modulus of less than 150 MPa include: low-crystallinity polyolefins such as very-low-density polyethylenes and ethylene-α-olefin random copolymers; aliphatic rubbers such as EPM, EPDM, IR, BR, and IIR; and olefin thermoplastic elastomers containing a hard segment of a polyethylene.

An olefin polymer (B) having a density of 0.85 to 0.90 g/cm$^3$ and a flexural modulus of less than 50 MPa as measured at 23° C. at 50% RH is preferred in order to provide a more excellent cumulative fatigue absorbing effect. Examples of the olefin polymer satisfying such conditions include low-crystallinity ethylene-α-olefin random copolymers, EPM, and EPDM.

The olefin polymer (B) typically has a glass transition temperature of −110° C. to 0° C., preferably −80° C. to −20° C., more preferably −70° C. to −40° C. The glass transition temperature range of the olefin polymer (B) is much lower than the room temperature, and the crystallinity of the olefin polymer (B) is low. Therefore, the resulting resin composition has a very excellent flexibility in a wide temperature range from the low temperature to the room temperature. Further, it is possible to impart the resin composition with a higher cumulative fatigue absorbing effect by blending the olefin polymer (B) with the EVOH (A). The glass transition temperature herein means a temperature at which an amorphous portion of the olefin polymer (B) is changed from a glass state to a rubber state. The glass transition temperature is typically measured in conformity with JIS K7121 by means of a differential scanning calorimeter.

The olefin polymer (B) typically has a melt flow rate (MFR) of 0.01 to 150 g/10 minutes, preferably 0.1 to 50 g/10 minutes, more preferably 1 to 25 g/10 minutes, and still more preferably 2 to 10 g/10 minutes, as measured at 210° C. with a load of 2160 g.

Where the melt viscosity of the EVOH (A) and the melt viscosity of the olefin polymer (B) are closer to each other, the EVOH (A) and the olefin polymer (B) can be more easily melt-kneaded. Therefore, the olefin polymer (B) is more homogeneously dispersed in the EVOH (A), so that the resulting resin composition is excellent in flexural resistance and transparency. More specifically, the ratio (A)/(B) between the MFR of the EVOH (A) and the MFR of the olefin polymer (B) as measured at 210° C. with a load of 2160 g is typically 0.1 to 10, preferably 0.3 to 4, more preferably 0.5 to 3.

As described above, the olefin polymer (B) having a lower crystallinity or a rubber property is blended with the EVOH (A) having a higher crystallinity, whereby the resin composition is imparted with flexibility. Hence, the resin composition is excellent in flexural resistance.

In the resin composition of the present disclosure, the blend weight ratio (A)/(B) of the EVOH (A) to the olefin polymer (B) is typically 1/99 to 99/1, preferably 50/50 to 99/1, more preferably 51/49 to 99/1, still more preferably 60/40 to 90/10, particularly preferably 70/30 to 85/15. Where the blend weight ratio of the EVOH (A) to the olefin polymer (B) falls within the aforementioned ranges, the coloration suppressing effect is more excellent.

The total amount of the EVOH (A) and the olefin polymer (B) contained in the resin composition of the present disclosure is typically not less than 70 wt. %, preferably not less than 80 wt. %, more preferably not less than 90 wt. %. The upper limit of the total amount of the EVOH (A) and the olefin polymer (B) corresponds to the weight obtained by subtracting the weight of the sorbic acid ester (C) from the weight of the resin composition.

The olefin polymer (B) to be used in the present disclosure may be an unmodified olefin polymer (B1) containing no polar group in its structure, or a carboxyl-modified olefin polymer (B2) containing a carbonyl group in its structure. The unmodified olefin polymer (B1) and the carboxyl-modified olefin polymer (B2) may be used in combination as the olefin polymer (B). Where the unmodified olefin polymer (B1) and the carboxyl-modified olefin polymer (B2) are used in combination as the olefin polymer (B), the total amount of the unmodified olefin polymer (B1) and the carboxyl-modified olefin polymer (B2) is regarded as the amount of the olefin polymer (B).

The unmodified olefin polymer (B1) is an olefin polymer having the aforementioned structure and having no modifying group. The unmodified olefin polymers described above may be used alone or in combination as the unmodified olefin polymer (B1). Particularly, an ethylene-butene random copolymer is preferably used. The density and the MFR of the unmodified olefin polymer (B1) are the same as the density and the MFR described for the olefin polymer (B).

Commercially available unmodified olefin polymers are usable as the unmodified olefin polymer (B1).

Examples of the commercially available unmodified olefin polymers include ethylene-based polymers (TAFMER DF&H available from Mitsui Chemicals, Inc.), propylene-based polymers (TAFMER H and TAFMER XM available from Mitsui Chemicals, Inc.), and butene-based polymers (TAFMER BL available from Mitsui Chemicals, Inc.)

Next, the carboxyl-modified olefin polymer (B2) will be described in detail.

The carboxyl-modified olefin polymer (B2) is a polymer obtained by modifying the lipophilic polymer (the olefin polymer such as polyolefin, olefin thermoplastic elastomer, aliphatic rubber, olefin-(meth)acrylate copolymer, or ionomer, typically having a number average molecular weight of not less than 10,000 and having a main chain constituted only by carbon bonds) with a carboxylic acid.

The carboxyl-modified olefin polymer (B2), which has carboxyl groups, is affinitive for the EVOH (A) having polar hydroxyl groups. Further, olefin polymer portions of the carboxyl-modified olefin polymer (B2) are affinitive for the unmodified olefin polymer (B1). Where the carboxyl-modified olefin polymer (B2) is used as the olefin polymer (B), therefore, the mixing efficiency and the reaction efficiency with respect to the EVOH (A) tend to be enhanced. Where the unmodified olefin polymer (B1) and the carboxyl-modified olefin polymer (B2) are used in combination as the olefin polymer (B), the carboxyl-modified olefin polymer (B2) serves as a compatibilizer for the EVOH (A) and the unmodified olefin polymer (B1).

For the modification with the carboxylic acid, the constituent monomers of the olefin polymer may be partly replaced with an α,β-unsaturated carboxylic acid or an α,β-unsaturated carboxylic acid anhydride and copolymerized, or an α,β-unsaturated carboxylic acid or an α,β-unsaturated carboxylic acid anhydride may be introduced into some of the side chains of the polymer by a graft reaction or the like.

Examples of the α,β-unsaturated carboxylic acid and the α,β-unsaturated carboxylic acid anhydride to be used for the modification with the carboxylic acid include maleic acid, acrylic acid, itaconic acid, crotonic acid, maleic anhydride, and itaconic anhydride. Of these, maleic anhydride is preferably used.

The modification degree of the carboxyl-modified olefin polymer (B2) (the amount of the carboxylic acid for the modification) is typically 0.01 to 10 wt. %, preferably 0.01 to 5 wt. %, particularly preferably 0.1 to 2 wt. %, especially preferably 0.2 to 1 wt. %, based on the weight of the base olefin polymer. If the modification degree is excessively low, the resulting resin composition tends to have a lower compatibility, failing to provide the effects of the present disclosure. If the modification degree is excessively high, on the other hand, the carboxyl-modified olefin polymer (B2) tends to have a greater number of reaction points with respect to the hydroxyl groups of the EVOH (A). This tends to result in generation of highly polymerized products in the melt kneading process, thereby deteriorating the formability, the heat stability, and the like during film formation.

The carboxyl-modified olefin polymer (B2) typically has a density of 0.85 to 0.96 g/cm$^3$, preferably 0.85 to 0.92 g/cm$^3$, more preferably 0.85 to 0.90 g/cm$^3$.

The carboxyl-modified olefin polymer (B2) typically has a melt flow rate (MFR) of 0.01 to 150 g/10 minutes, preferably 0.1 to 50 g/10 minutes, more preferably 1 to 25 g/10 minutes, still more preferably 1.5 to 10 g/10 minutes, as measured at 210° C. with a load of 2160 g.

Where the melt viscosity of the EVOH (A) and the melt viscosity of the carboxyl-modified olefin polymer (B2) are closer to each other, the melt kneading can be facilitated. Therefore, the resin composition tends to be excellent in flexural resistance and transparency. More specifically, the ratio (A)/(B2) between the MFR of the EVOH (A) and the MFR of the carboxyl-modified olefin polymer (B2) as measured at 210° C. with a load of 2160 g is typically 0.1 to 10, preferably 0.5 to 7.5.

Commercially available carboxyl-modified olefin polymers are usable as the carboxyl-modified olefin polymer (B2). Examples of the commercially available carboxyl-modified olefin polymers include ADMER and TAFMER M series (available from Mitsui Chemicals, Inc.), BYNEL and FUSABOND (available from E. I. du Pont de Nemours and Company), OREVAC (available from Arkema, Inc.), PLEXAR (available from LyondellBasell LLC), and MODIC AP (available from Mitsubishi Chemical Corporation).

The carboxyl-modified olefin polymer (B2) to be used in the present disclosure may be a modified polymer obtained by post-modifying some of carboxylic acid portions of the carboxyl-modified olefin polymer (B2) with some other compound (e.g., a polyamide resin such as polyamide 6 or polyamide 6/12), as long as the effects of the present disclosure are not impaired.

Where the unmodified olefin polymer (B1) and the carboxyl-modified olefin polymer (B2) are used in combination as the olefin polymer (B), the weight ratio (B2)/(B1) between the carboxyl-modified olefin polymer (B2) and the unmodified olefin polymer (B1) is typically 0.01 to 10, preferably 0.01 to 1, more preferably 0.02 to 0.8, particularly preferably 0.03 to 0.5, depending upon the modification degree of the carboxyl-modified olefin polymer (B2).

[Sorbic Acid Ester (C)]

In the present disclosure, the resin composition containing the EVOH (A) and the olefin polymer (B) further contains the sorbic acid ester (C) in a specific very small amount, thereby providing a remarkable coloration suppressing effect.

As described above, the resin composition containing the EVOH (A) and the olefin polymer (B) is generally susceptible to the coloration during the melt kneading and the melt forming. The resin composition is liable to be colored supposedly because shear stress is applied to the resin composition to generate heat when the EVOH (A) and the olefin polymer (B) are melt-mixed together, and the EVOH (A) is dehydrated due to the heat thus generated.

In the present disclosure, a reason why the coloration of the resin composition is suppressed by the blending of the specific very small amount of the sorbic acid ester (C) is supposedly that the sorbic acid ester (C) has a lower polarity and, therefore, can be homogeneously dispersed in the EVOH (A) even if being present in the very small amount in the resin composition. It is considered that the sorbic acid ester (C) is hydrolyzed to generate sorbic acid, which in turn captures radicals, whereby the excellent coloration suppressing effect is provided. Further, it is supposed that a so-called catalytic cycle occurs in which an alcohol resulting from the hydrolysis of the sorbic acid ester (C) reacts with sorbic acid capturing the radicals, whereby the sorbic acid ester (C) is generated, and then the sorbic acid ester (C) thus generated is thermally hydrolyzed again.

It is supposed that sorbic acid capable of capturing the radicals thus constantly occurs and, therefore, the radicals can be captured in the resin composition at the early stage of the radical generation, making it possible to provide the excellent coloration suppressing effect. It is also supposed that, in the present disclosure in which the resin composition contains the sorbic acid ester (C) in the specific very small amount, the aforementioned cycle can efficiently work to thereby provide the remarkable coloration suppressing effect.

A sorbic acid ester prepared by condensation of sorbic acid and an alcohol or a phenol derivative, for example, is usable as the sorbic acid ester (C). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of the alcohol resulting from the hydrolysis of the sorbic acid ester (C) is relatively low, the resin composition is less susceptible to the coloration. Therefore, the alkyl sorbates are preferred, and alkyl sorbates containing a C1 to C5 alkoxy group are more preferred. Alkyl sorbates containing a C1 to C3 alkoxy group are particularly preferred, and methyl sorbate and ethyl sorbate are most preferred. Ethyl sorbate is especially preferred.

The sorbic acid ester (C) typically has a molecular weight of 120 to 220, preferably 120 to 200, particularly preferably 120 to 160. Where the molecular weight of the sorbic acid ester (C) falls within the aforementioned ranges, the coloration suppressing effect tends to be efficiently provided.

The amount of the sorbic acid ester (C) contained in the resin composition is 0.00001 to 10 ppm, preferably 0.00005 to 5 ppm, more preferably 0.0001 to 3 ppm, particularly preferably 0.0005 to 0.5 ppm, especially preferably 0.001 to 0.1 ppm, based on the weight of the resin composition. Where the amount of the sorbic acid ester (C) falls within the aforementioned ranges, the coloration suppressing effect is efficiently provided. If the amount of the sorbic acid ester (C) is excessively great, the number of conjugated double bonds is excessively great, so that the coloration is liable to result.

The amount of the sorbic acid ester (C) contained in the resin composition is typically 0.0001 to 10 ppm, preferably 0.0003 to 5 ppm, more preferably 0.0005 to 3 ppm, particularly preferably 0.0008 to 1 ppm, especially preferably 0.001 to 0.5 ppm, based on the total weight of the EVOH (A) and the sorbic acid ester (C). Where the amount of the sorbic acid ester (C) falls within the aforementioned ranges, the coloration suppressing effect tends to be efficiently provided. If the amount of the sorbic acid ester (C) is excessively great, the number of conjugated double bonds is excessively great, so that the coloration is liable to result.

In the case of pellets and other products formed from the resin composition of the present disclosure, the amount of the sorbic acid ester (C) contained in the resin composition can be measured by the following method. A sample is first prepared by pulverizing the formed product (e.g., the pellets) by a given method (e.g., a freeze-pulverizing method), and dissolving the pulverized product in a C1 to C5 lower alcohol solvent. Then, the sample is analyzed by a liquid chromatography/mass spectrometry (LC/MS/MS) method, whereby the amount of the sorbic acid ester (C) is determined.

In the case of a formed product containing the resin composition and some other thermoplastic resin or the like (e.g., a multilayer structure), a layer of the resin composition to be analyzed is taken out of the multilayer structure by a given method, and the measurement is performed in the aforementioned manner.

[Hydrocarbon Resin (D)]

The resin composition of the present disclosure preferably further contains a hydrocarbon resin (D) as a dispersing agent. In the present disclosure, the hydrocarbon resin (D) typically has a number average molecular weight of 100 to 3,000 and a softening point of not lower than 60° C. and lower than 170° C. The hydrocarbon resin (D) belongs to thermoplastic resins that are generally liquid or solid at an ordinary temperature.

Specific examples of the hydrocarbon resin (D) include: natural hydrocarbon resins such as rosin resins (rosin, modified rosins such as hydrogenated rosin, disproportionated rosin, and polymerized rosin, and rosin esters such as glycerin esters and pentaerythritol esters of the modified rosins), and terpene resins (polyterpenes, aromatic modified terpene resins, hydrogenated terpene resins, and terpene phenol resins); and synthetic hydrocarbon resins such as petroleum resins, coumarone indene resins, phenol resins (alkylphenol resins, rosin-modified phenol resins, and the like), styrene resins, and xylene resins.

The petroleum resins mean resins obtained by polymerizing a fraction containing unsaturated hydrocarbon monomers by-produced by pyrolysis of petroleum naphtha or the like. Specifically, the petroleum resins are classified into aliphatic petroleum resin (C5 petroleum resin), aromatic petroleum resin (C9 petroleum resin), aliphatic/aromatic petroleum resin (C5/C9 petroleum resin), and alicyclic petroleum resin.

The aliphatic petroleum resin (C5 petroleum resin) is a synthetic resin obtained by polymerizing a refined C5 fraction of cracked petroleum naphtha. Specific examples of the aliphatic petroleum resin (C5 petroleum resin) include QUINTON 100 series (available from Zeon Corporation), and ESCOREZ 1000 series (available from Exxon Mobil Corporation).

The aromatic petroleum resin (C9 petroleum resin) is a synthetic resin obtained by polymerizing a refined C9 fraction of cracked petroleum naphtha. Specific examples of the aromatic petroleum resin (C9 petroleum resin) include PETCOAL (available from Tosoh Corporation), and NISSEKI NEOPOLYMER (available from JXTG Nippon Oil and Energy Corporation).

The aliphatic/aromatic petroleum resin (C5/C9 petroleum resin) is a synthetic resin obtained by copolymerizing the aforementioned C5 fraction and C9 fraction blended together. Specific examples of the aliphatic/aromatic petroleum resin (C5/C9 petroleum resin) include PETROTACK (available from Tosoh Corporation), TOHO HIGH RESIN (available from Toho Chemical Industry Co., Ltd.), QUINTON 100 series (available from Zeon Corporation), and ESCOREZ 2000 series (available from Exxon Mobil Corporation).

Examples of the alicyclic petroleum resin include a hydrogenated petroleum resin obtained by hydrogenating the aromatic petroleum resin or the aliphatic/aromatic petroleum resin, and a synthetic resin synthesized by using dicyclopentadiene extracted from the C5 fraction as a main material.

Particularly, the hydrogenated petroleum resin obtained by hydrogenating the aromatic petroleum resin or the aliphatic/aromatic petroleum resin is a typical example. Specific examples of the hydrogenated petroleum resin include ARKON (available from Arakawa Chemical Industries, Ltd.), I-MARV (available from Idemitsu Kosan Co., Ltd.), and ESCOREZ 5000 series (available from Exxon Mobil Corporation).

These hydrogenated petroleum resins have different polarities depending on the hydrogenation degree, and are classified into two types, i.e., a full hydrogenation type having a hydrogenation degree of not less than 90% and a partial hydrogenation type having a hydrogenation degree of less than 90%. Examples of the former type include ARKON P GRADE (available from Arakawa Chemical Industries, Ltd.), and I-MARV P TYPE (available from Idemitsu Kosan Co., Ltd.) Examples of the latter type include ARKON M GRADE (available from Arakawa Chemical Industries, Ltd.), and I-MARV S TYPE (available from Idemitsu Kosan Co., Ltd.)

Specific examples of an alicyclic petroleum resin prepared by a method other than the hydrogenation, i.e., the synthetic resin synthesized by using dicyclopentadiene extracted from the C5 fraction as the main material, include QUINTON 1000 series (available from Zeon Corporation), and MARUKAREZ M series (available from Maruzen Petrochemical Co., Ltd.)

In order to improve the transparency, the color tone, and other appearance factors, and the odorless property of the resin composition of the present disclosure, the petroleum resins are preferably used, and the alicyclic petroleum resin is more preferably used. Particularly, the hydrogenated petroleum resin is preferably used.

The hydrogenation degree of the hydrogenated petroleum resin is not particularly limited. In consideration of the affinity for the unmodified olefin polymer (B1), the hydrogenated petroleum resin of the full hydrogenation type is preferably used.

The hydrocarbon resin (D) typically has a number average molecular weight of 100 to 3,000, preferably not less than 300 and less than 1,500, particularly preferably not less than 400 and less than 1,000. If the number average molecular weight is excessively low, the hydrocarbon resin (D) is liable to be liquified in a material feeder during the melt mixing. Particularly, when the liquified hydrocarbon resin has a low viscosity, mixing failure is liable to occur. Therefore, a film formed from the resin composition tends to have lower transparency due to uneven dispersion of the hydrocarbon resin (D), and the hydrocarbon resin (D) is liable to bleed from a product formed from the resin composition. If the number average molecular weight is excessively high, it tends to be difficult for the hydrocarbon resin (D) to infiltrate in a fluid form into the agglomerate of the olefin polymer (B) in the melt kneading. Further, the hydrocarbon resin (D) is liable to separate from the EVOH (A) due to the lipophilic property thereof and, therefore, the formed product is liable to suffer from gumming, streaking, and other appearance defects.

The number average molecular weight may be calculated based on a polystyrene equivalent value determined through measurement by a gel permeation chromatography (GPC).

The hydrocarbon resin (D) typically has a softening point of not lower than 60° C. and lower than 170° C., preferably not lower than 95° C. and lower than 160° C., particularly preferably not lower than 120° C. and lower than 150° C. If the softening point is excessively low, the hydrocarbon resin (D) is liable to be liquified to have a lower viscosity in a material feeder during the melt mixing and, therefore, the effect of the hydrocarbon resin (D) as the dispersing agent tends to be insufficient. Therefore, the flexural resistance and transparency improving effect tends to be insufficient due to the uneven dispersion of the olefin polymer (B). Further, the hydrocarbon resin (D) is liable to bleed from the formed product. If the softening point is excessively high, the hydrocarbon resin (D) is liable to be partly left unmelted during the melt mixing to be thereby deteriorated in dispersing agent function. Therefore, the flexural resistance and the transparency tend to be insufficient. Further, portions of the hydrocarbon resin (D) left unmelted tend to cause fisheyes and other abnormalities in a film formed from the resin composition.

A method according to JIS K2207 (ring and ball method) may be employed for measurement of the softening point.

The hydrocarbon resin (D) typically has a color tone corresponding to a Gardner number of not greater than 3, preferably not greater than 2, particularly preferably not greater than 1, as measured in conformity with JIS K0071-2 (Gardner number). If the Gardner number is greater than 3, the resin composition tends to be poorer in appearance properties with a higher yellowness degree.

Where the hydrocarbon resin (D) is the hydrogenated petroleum resin, the hydrocarbon resin (D) typically has a Hazen number of not greater than 200, preferably not greater than 150, particularly preferably not greater than 100, as measured in conformity with JIS K0071-1 (Hazen number). Where a hydrogenated petroleum resin having a Hazen number of not greater than 200 is used as the hydrocarbon resin (D), the resin composition is colorless and transparent, and excellent in appearance properties.

The form of the hydrocarbon resin (D) at an ordinary temperature is not particularly limited, but may be powdery form, aggregated form, flake form, pellet form (granular form), liquid form, or the like. The hydrocarbon resin (D) is preferably in the flake form or the pellet form, particularly in the pellet form, from the viewpoint of the working efficiency and the measuring efficiency for the mixing.

As described above, the hydrocarbon resin (D) can function not only to finely disperse the olefin polymer (B) in the EVOH (A), but also to reduce the viscosity of the composition (or increase the MFR value of the composition) during the melting, because the hydrocarbon resin (D) is liquified in the melt forming. This supposedly provides the following effect. Where the carboxyl-modified olefin polymer (B2) is used as the olefin polymer (B), the carboxyl groups contained in the carboxyl-modified olefin polymer (B2) can react with the hydroxyl groups of the EVOH (A). Therefore, a highly polymerized product is liable to be generated by the reaction between these functional groups during the melt kneading process. The generation of the highly polymerized product is liable to increase the melt viscosity to generate shear heat in an extruder. This further increases the amount of the highly polymerized product, so that a film formed from the resin composition is liable to suffer from streaking, fisheyes, and other appearance defects. However, it is considered that, since the viscosity of the resin composition in the melted state can be reduced by the blending of the hydrocarbon resin (D), the hydrocarbon resin (D) is effectively contributable to the suppression of the generation of the shear heat, the suppression of the generation of the highly polymerized product, and the improvement of product quality.

In the resin composition, the blend weight ratio of the hydrocarbon resin (D) is typically 0.5 to 7.5 wt. %, preferably 1 to 6 wt. %, based on the total weight of the EVOH (A), the olefin polymer (B), the sorbic acid ester (C), and the hydrocarbon resin (D). If the amount of the hydrocarbon resin (D) is excessively small, it tends to be difficult to provide the effect of blending the hydrocarbon resin (D) as the dispersing agent. If the amount of the hydrocarbon resin (D) is excessively great, on the other hand, an excess amount of the hydrocarbon resin (D) tends to be expelled and, therefore, the film is liable to suffer from streaking, gumming, and other appearance defects.

[Other Thermoplastic Resin]

The resin composition of the present disclosure may further contain a thermoplastic resin other than the EVOH (A), the olefin polymer (B), and the hydrocarbon resin (D) as a resin component typically in an amount of not greater than 10 wt. %, preferably not greater than 5 wt. %, particularly preferably not greater than 3 wt. %, based on the weight of the resin composition.

Specific examples of the other thermoplastic resin include polyester resins, chlorinated vinyl resins such as polyvinyl chlorides and polyvinylidene chlorides, polyamide resins, acrylic resins, vinyl ester resins, polystyrene elastomers, polyester elastomers, polyurethane elastomers, chlorinated polyethylenes, and chlorinated polypropylenes. These thermoplastic resins may be used alone or in combination.

[Other Additives]

As required, the resin composition of the present disclosure may contain known additives in addition to the aforementioned components in amounts that do not impair the effects of the present disclosure (e.g., typically in amounts of not greater than 10 wt. %, preferably not greater than 5 wt. %, particularly preferably not greater than 3 wt. %, based on the overall weight of the resin composition). Examples of the additives include: plasticizer (e.g., aliphatic polyhydric alcohol such as ethylene glycol, glycerin, hexanediol, or the like); lubricant such as higher fatty acid (e.g., lauric acid, myristic acid, palmitic acid, stearic acid, behenic acid, oleic acid, or the like), higher fatty acid metal salt (e.g., calcium stearate, magnesium stearate, or the like), higher fatty acid ester (e.g., methyl ester, isopropyl ester, butyl ester, octyl ester, or the like of higher fatty acid), higher fatty acid amide (e.g., stearamide, oleamide, or the like), bis-higher fatty acid amide (e.g., ethylene bis-stearamide, or the like), or low-molecular weight polyolefin (e.g., low-molecular weight polyethylene or low-molecular weight polypropylene having a number average molecular weight of less than 10,000); drying agent; oxygen absorber; heat stabilizer; photo stabilizer; flame retardant; crosslinking agent; curing agent; foaming agent; crystal nucleating agent; antifogging agent; biodegradation agent; silane coupling agent; antiblocking agent; antioxidant; colorant; antistatic agent; UV absorber; antibacterial agent; insoluble inorganic double salt (e.g., hydrotalcites or the like); surfactant; and wax. These may be used alone or in combination.

Examples of the heat stabilizer to be used for improving the heat stability and other various physical properties during the melt forming include: organic acids such as acetic acid, propionic acid, and butyric acid, salts of the organic acids such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and alkali metal salts (sodium salts, potassium salts, and the like), alkali earth metal salts (calcium salts, magnesium salts, and the like), and zinc salts of the inorganic acids.

Of these, acetic acid, boron compounds such as boric acid and its salts, acetic acid salts, and phosphoric acid salts are preferably blended as the heat stabilizer.

The amount of acetic acid to be blended as the heat stabilizer is typically 0.001 to 1 part by weight, preferably 0.005 to 0.2 parts by weight, particularly preferably 0.01 to 0.1 part by weight, based on 100 parts by weight of the EVOH (A). If the amount of acetic acid is excessively small, the effect of blending acetic acid tends to be reduced. If the amount of acetic acid is excessively great, on the other hand, formation of a uniform film tends to be difficult.

The amount of a boron compound to be blended as the heat stabilizer is typically 0.001 to 1 part by weight on a boron basis based on 100 parts by weight of the EVOH (A) (as measured by ICP emission spectrometry after ashing). If the amount of the boron compound is excessively small, the effect of blending the boron compound tends to be reduced. If the amount of the boron compound is excessively great, on the other hand, formation of a uniform film tends to be difficult.

The amount of an acetic acid salt or a phosphoric acid salt (or a hydrogen phosphoric acid salt) to be blended as the heat stabilizer is typically 0.0005 to 0.1 part by weight on a metal basis based on 100 parts by weight of the EVOH (A) (as measured by ICP emission spectrometry after ashing). If the amount of the acetic acid salt or the phosphoric acid salt is excessively small, the effect of the blending tends to be reduced. If the amount of the acetic acid salt or the phosphoric acid salt is excessively great, on the other hand, formation of a uniform film tends to be difficult. Where two or more salts are blended in the resin composition, the total amount of the two or more salts preferably falls within the aforementioned range.

[Resin Composition Production Method]

The resin composition of the present disclosure is produced by using the EVOH (A), the olefin polymer (B), and the sorbic acid ester (C) as the essential components and, as required, using the hydrocarbon resin (D) and any of the aforementioned optional additives. Known examples of a method for the production include dry blending method, melt mixing method, solution mixing method, and impregnation method, which may be used in combination.

An example of the dry blending method is a method (I) including the step of dry-blending the sorbic acid ester (C) with pellets containing at least one selected from the group consisting of the EVOH (A) and the olefin polymer (B) by means of a tumbler or the like.

Examples of the melt mixing method include: a method (II) including the steps of melt-kneading a dry blend of the sorbic acid ester (C) and pellets containing at least one selected from the group consisting of the EVOH (A) and the olefin polymer (B), and forming the resulting melt mixture into pellets or other product; and a method (III) including the steps of adding the sorbic acid ester (C) to at least one selected from the group consisting of the EVOH (A) and the olefin polymer (B) in a melted state, melt-kneading the resulting mixture, and forming the resulting melt mixture into pellets or other product.

Examples of the solution mixing method include: a method (IV) including the steps of preparing a solution by using commercially available pellets containing at least one selected from the group consisting of the EVOH (A) and the olefin polymer (B), blending the sorbic acid ester (C) with the solution, solidifying and forming the resulting solution into pellets, separating the pellets from the solution, and drying the pellets; and a method (V) including the steps of adding at least one selected from the group consisting of the sorbic acid ester (C) and a solution of the olefin polymer (B) to a homogeneous solution (water/alcohol solution or the like) of the EVOH after the saponification in the preparation of the EVOH (A), solidifying and forming the resulting solution into pellets, separating the pellets from the solution, and drying the pellets.

An example of the impregnation method is a method (VI) including the steps of bringing pellets containing at least one selected from the group consisting of the EVOH (A) and the olefin polymer (B) into contact with an aqueous solution containing the sorbic acid ester (C) to incorporate the sorbic acid ester (C) into the pellets, and then drying the resulting pellets.

In the methods described above, a composition (master batch) containing the sorbic acid ester (C) at a higher concentration may be prepared by blending the sorbic acid ester (C) in a predetermined proportion with at least one selected from the group consisting of the EVOH (A) and the olefin polymer (B), and the resin composition may be produced as containing the sorbic acid ester (C) at a predetermined concentration by blending the master batch with the EVOH (A) or the olefin polymer (B).

In the present disclosure, different methods may be selected from the aforementioned methods to be used in combination. Particularly, the melt mixing method is preferred, and the method (II) is particularly preferred, because the resin composition produced by these methods is significantly improved in productivity and the effects of the present disclosure.

Where the hydrocarbon resin (D) and any of the aforementioned additives are blended as optional components in the resin composition, the aforementioned production methods may be employed in substantially the same manner for blending the optional components in the resin composition.

Pellets of the resin composition to be produced by any of the aforementioned methods, and the pellets containing at least one selected from the group consisting of the EVOH (A) and the olefin polymer (B) to be used in any of the aforementioned methods may each have any desired shape. The pellets may each have, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and tactually identified, and the minor diameter of the maximum sectional plane is measured in the aforementioned manner.

The resin composition of the present disclosure typically has a water content of 0.01 to 0.5 wt. %, preferably 0.05 to 0.35 wt. %, particularly preferably 0.1 to 0.3 wt. %.

In the present disclosure, the water content of the resin composition is measured and calculated by the following method.

The weight (W1) of a sample of the resin composition is measured at a room temperature (25° C.) by an electronic balance before drying, and the sample is dried at 150° C. for 5 hours in a hot air dryer. After the drying, the sample is cooled in a desiccator for 30 minutes. After the temperature of the sample of the resin composition is returned to the room temperature (25° C.), the weight (W2) of the sample is measured. The water content of the resin composition is calculated from the following expression: Water content (wt. %)=[(W1−W2)/W1]×100

The resin composition of the present disclosure may be produced in any of various forms, e.g., in pellet form, powdery form, or liquid form, for use as a forming material for various formed products. Particularly, the resin composition of the present disclosure is preferably provided as a melt forming material, because the effects of the present disclosure tend to be more efficiently provided. The resin composition of the present disclosure may be a resin composition prepared by mixing the resin composition with a resin other than the EVOH (A) and the olefin polymer (B).

The pellets of the resin composition of the present disclosure may be used as they are for the melt forming. In order to ensure stable feeding of the resin composition pellets in the melt forming, it is also preferred to apply a known lubricant to surfaces of the pellets. Any of the lubricants described above may be used. The amount of the lubricant present on the pellets is typically not greater than 5 wt. %, preferably not greater than 1 wt. %, based on the weight of the resin composition.

Exemplary products to be formed from the resin composition of the present disclosure for practical applications include a single-layer film formed by using the resin composition of the present disclosure, and a multilayer structure including a layer formed by using the resin composition of the present disclosure.

[Multilayer Structure]

A multilayer structure of the present disclosure includes a layer formed from the resin composition of the present disclosure. The layer formed from the resin composition of the present disclosure (hereinafter referred to as "resin composition layer") may be laminated with some other base material (hereinafter referred to as "base resin") containing a thermoplastic resin other than the resin composition of the present disclosure as a major component. Thus, the resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred as hydrophobic resins.

Where layers a (a1, a2, . . . ) formed from the resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin may be properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layer is provided between the resin composition layer and the base resin layer in the multilayer structure, the adhesive resin layer is located in contact with the resin composition layer and, therefore, a highly hydrophobic adhesive resin is preferably used for the adhesive resin layer.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the weight of the base resin or the adhesive resin). These may be used alone or in combination.

The resin composition layer formed from the resin composition of the present disclosure and the base resin layer may be laminated together (optionally with the adhesive resin layer provided therebetween) by a known laminating method. Examples of the laminating method include: a method in which a film or a sheet of the resin composition of the present disclosure is laminated with the base resin by melt extrusion; a method in which the base resin layer is laminated with the resin composition of the present disclosure by melt extrusion; a method in which the resin composition and the base resin are coextruded; a method in which the resin composition layer and the base resin layer are dry-laminated together with the use of a known adhesive agent such as of organic titanium compound, isocyanate compound, polyester compound or polyurethane compound; and a method in which a solution of the resin composition is applied on the base resin layer, and a solvent is removed from the applied solution. Of these methods, the coextrusion method is preferred from the viewpoint of costs and environmental concerns.

The multilayer structure described above is further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a well-known manner. For example, the stretched film is typically heat-treated at 80° C. to 180° C., preferably 100° C. to 165° C., for about 2 to about 600 seconds, while being kept tense. Where the stretched multilayer film produced by using the resin composition of the present disclosure is used as a shrinkable film, the stretched film may be cold-set so as to be imparted with a heat-shrinkable property, for example, by applying cold air over the stretched film without performing the above heat setting process.

Further, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 µm, preferably 30 to 3,000 µm, particularly preferably 50 to 2,000 µm. The thickness of the resin composition layer is typically 1 to 500 m, preferably 3 to 300 µm, particularly preferably 5 to 200 µm. The thickness of the base resin layer is typically 5 to 3,000 µm, preferably 10 to 2,000 µm, particularly preferably 20 to 1,000 µm. The thickness of the adhesive resin layer is typically 0.5 to 250 µm, preferably 1 to 150 µm, particularly preferably 3 to 100 µm.

The thickness ratio between the resin composition layer and the base resin layer of the multilayer structure (resin composition layer/base resin layer) (if these layers each include a plurality of layers, the thickness ratio between the thickest one of the resin composition layers and the thickest one of the base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like. Particularly, the layer formed from the resin composition of the present disclosure is flexible and less susceptible to the coloration. Therefore, the resin composition of the present disclosure and the multilayer structure including the layer formed from the resin composition of the present disclosure are particularly useful for liquid packaging materials (e.g., bags for bag-in-box type packages, inner bags for pouch-in-dispenser type packages, and the like) for packaging water, foods, chemical agents, agricultural chemicals, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

Prior to implementation of Examples, pellets of the following EVOH (A) and olefin polymers (B) were prepared.

EVOH (A): Ethylene-vinyl alcohol copolymer having an ethylene structural unit content of 29 mol %, a saponification degree of 100 mol %, and an MFR of 3.2 g/10 minutes (as measured at 210° C. with a load of 2160 g)

Unmodified olefin polymer (B1-1): Ethylene-butene random copolymer (TAFMER A-4085S available from Mitsui Chemicals, Inc.) having a density of 0.89 g/cm$^3$, a flexural modulus of 30 MPa as measured at 23° C. at 50% RH, and an MFR of 5.2 g/10 minutes as measured at 210° C. with a load of 2160 g Carboxyl-modified olefin polymer (B2-1): Polypropylene modified with maleic anhydride (PLEXAR PX6002 available from Lyondell Basell LLC) having a density of 0.89 g/cm$^3$, and an MFR of 2.3 g/10 minutes as measured at 210° C. with a load of 2160 g Example 1

First, 80 parts of the pellets of the EVOH (A) and 20 parts of the pellets of the unmodified olefin polymer (B1-1) were dry-blended. Then, 100 parts of the dry-blended pellets and 0.0000004 parts (corresponding to 0.004 ppm based on the weight of resin composition) of methyl sorbate (available from FUJIFILM Wako Pure Chemical Corporation, and having a molecular weight of 126) as the sorbic acid ester (C) were pre-heated at 230° C. for 5 minutes by a plastograph (available from Brabender Corporation) and then melt-kneaded at 230° C. for 5 minutes by operating the plastograph at 50 rpm. Then, the resulting melt mixture was cooled and solidified, whereby a resin composition was prepared in an aggregated form.

The resin composition thus prepared was pulverized by operating a crusher (SKR16-240 available from Sometani Sangyo Co., Ltd.) with its rotary blade rotated at a rotation speed of 650 rpm. The pulverized product of the resin composition was in a granular form having a size of 1- to 5-mm square. The resin composition had a water content of 0.15%.

Example 2

A resin composition and a pulverized product of the resin composition of Example 2 were produced in substantially the same manner as in Example 1, except that the amount of methyl sorbate was 0.00008 parts (corresponding to 0.8 ppm based on the weight of the resin composition). The resin composition had a water content of 0.18%.

Example 3

A resin composition and a pulverized product of the resin composition of Example 3 were produced in substantially the same manner as in Example 1, except that ethyl sorbate (available from FUJIFILM Wako Pure Chemical Corporation, and having a molecular weight of 140) was used instead of methyl sorbate. The resin composition had a water content of 0.17%.

Example 4

A resin composition and a pulverized product of the resin composition of Example 4 were produced in substantially the same manner as in Example 1, except that the carboxyl-modified olefin polymer (B2-1) was used instead of the unmodified olefin polymer (B1-1). The resin composition had a water content of 0.16%.

Comparative Example 1

A resin composition and a pulverized product of the resin composition of Comparative Example 1 were produced in substantially the same manner as in Example 1, except that methyl sorbate was not blended. The resin composition had a water content of 0.18%.

Comparative Example 2

A resin composition and a pulverized product of the resin composition of Comparative Example 2 were produced in substantially the same manner as in Example 1, except that the amount of methyl sorbate was 0.0012 parts (corresponding to 12 ppm based on the weight of the resin composition). The resin composition had a water content of 0.14%.

The resin compositions of Examples 1 to 4 and Comparative Examples 1 and 2 were each evaluated by the following methods. The results are shown below in Table 1.

[Heat Stability Evaluation]

For heat stability evaluation, 5 mg of each of the resin compositions was used as a sample, and the weight reduction percentage of the sample was measured at a temperature of 230° C. at a gas flow rate of 20 mL/minute in a period of 1 hour in a nitrogen atmosphere by means of a thermogravimeter (PYRIS 1 TGA available from Perkin Elmer, Inc.) A lower value of the weight reduction percentage means that the resin composition was not decomposed and, hence, was excellent in heat stability.

[Coloration Evaluation]

The pulverized products of the resin compositions produced in the aforementioned manner were each used as a sample, and evaluated based on the area ratio ("4076+4077+4078"/"4093+4094+4095") of the total area of colored areas having Color Nos. 4093 (R248, G248, B216), 4094 (R248, G248, B232), and 4095 (R248, G248, B248) to the total area of colored areas having Color Nos. 4076 (R248, G232, B200), 4077 (R248, G232, B216), and 4078 (R248, G232, B232) measured by means of a visual analyzer IRIS VA400 (available from Alpha mos K.K.) Color Nos. 4076, 4077, and 4078 mean deep yellowish colors, and Color Nos. 4093, 4094, and 4095 mean light yellowish colors. Where the area ratio of the colored areas having the deep yellowish colors is higher, this means that the sample was yellowed.

TABLE 1

|  | Example 1 | Example 2 | Example 3 | Example 4 | Comparative Example 1 | Comparative Example 2 |
|---|---|---|---|---|---|---|
| EVOH (A) (parts) | 80 | 80 | 80 | 80 | 80 | 80 |
| Olefin polymer (B) | | | | | | |
| Type | B1-1 | B1-1 | B1-1 | B2-1 | B1-1 | B1-1 |
| Amount (parts) | 20 | 20 | 20 | 20 | 20 | 20 |
| Sorbic acid ester (C) | | | | | | |
| Type | Methyl sorbate | Methyl sorbate | Ethyl sorbate | Methyl sorbate | — | Methyl sorbate |
| Amount (ppm) | 0.004 | 0.8 | 0.004 | 0.004 | — | 12 |
| Heat stability evaluation (%) | 0.4 | 0.4 | 0.4 | 0.4 | 0.4 | 0.4 |
| Coloration evaluation | 0.4 | 0.7 | 0.2 | 0.4 | 1.0 | 0.8 |

As shown in Table 1, the resin composition of Comparative Example 2 containing the sorbic acid ester (C) in an amount greater than the range specified in the present disclosure had substantially the same heat stabilizing effect as the resin composition of Comparative Example 1 containing the EVOH (A) and the olefin polymer (B) and not containing the sorbic acid ester (C), but was less susceptible to the coloration than the resin composition of Comparative Example 1.

In contrast, the resin compositions of Examples 1 to 4 each had a higher coloration suppressing effect than the resin composition of Comparative Example 2 without deterioration in heat stability, though containing the sorbic acid ester (C) in a smaller amount than the resin composition of Comparative Example 2. This indicates that the resin compositions of Examples of the present disclosure provide a noticeable coloration suppressing effect. In the present disclosure, the coloration evaluation of the resin compositions was carried out by preheating the resin compositions at 230° C. for 5 minutes and then melt-kneading the resin compositions for 5 minutes. In an industrial melt forming process, a resin composition often stagnates in an extruder and a die for several hours to several days to be thereby continuously heated. Therefore, it is considered that a difference of 0.1 observed in the coloration evaluation in the present disclosure is enhanced to a significant difference in the industrial process.

Multilayer structures produced by using the resin compositions of Examples produced in the aforementioned manner, and liquid packaging materials produced by using the multilayer structures are less susceptible to the coloration.

While specific forms of the embodiments of the present disclosure have been shown in the aforementioned examples, the examples are merely illustrative but not limitative. It is contemplated that various modifications apparent to those skilled in the art could be made within the scope of the disclosure.

The resin composition of the present disclosure is flexible and less susceptible to the coloration. Therefore, the resin composition of the present disclosure and the multilayer structure including the layer formed from the resin composition of the present disclosure are useful as packaging materials for various foods, condiments such as mayonnaise and dressing, fermented foods such as miso, fat and oil such as salad oil, water, beverages, cosmetics, pharmaceutical products, and the like, and particularly useful for liquid packaging materials (e.g., bags for bag-in-box type packages, inner bags for pouch-in-dispenser type packages).

The invention claimed is:

1. A resin composition comprising:
   (A) an ethylene-vinyl alcohol copolymer;
   (B) an olefin polymer; and
   (C) at least one sorbic acid ester selected from the group consisting of methyl sorbate and ethyl sorbate;
   wherein the ethylene-vinyl alcohol copolymer (A) and the olefin polymer (B) are present in a weight ratio (A)/(B) of 50/50 to 99/1; and
   wherein the at least one sorbic acid ester (C) is present in an amount of 0.00001 to 0.008 ppm based on a weight of the resin composition.

2. The resin composition according to claim 1, wherein the olefin polymer (B) is at least one selected from the group consisting of polyolefin, olefin thermoplastic elastomer, aliphatic rubber, olefin-(meth)acrylate copolymer, and ionomer.

3. The resin composition according to claim 1, wherein the olefin polymer (B) has a density of 0.85 to 0.96 g/cm$^3$.

4. The resin composition according to claim 1, wherein the olefin polymer (B) has a flexural modulus of less than 150 MPa as measured at 23° C. at 50% RH.

5. A melt-forming material comprising the resin composition according to claim 1.

6. A multilayer structure comprising a layer which comprises the resin composition according to claim 1.

7. A liquid packaging material comprising the multilayer structure according to claim 6.

8. The resin composition according to claim 1, wherein the amount of the least one sorbic acid ester (C) that is present in the resin composition is in the range of from 0.00001 to 0.004 ppm based on a weight of the resin composition.

* * * * *